United States Patent [19]

Murasawa

[11] 4,048,585
[45] Sept. 13, 1977

[54] TUNING TYPE LASER OSCILLATOR APPARATUS AND LASER RADAR SYSTEM AND LASER COMMUNICATION SYSTEM USING THE SAME

[75] Inventor: Kengo Murasawa, Yokohama, Japan

[73] Assignee: Hitachi, Ltd., Japan

[21] Appl. No.: 624,985

[22] Filed: Oct. 22, 1975

[30] Foreign Application Priority Data

Oct. 23, 1974 Japan ............................... 49-121411

[51] Int. Cl.² ............................................... H01S 3/10
[52] U.S. Cl. ................................................ 331/94.5 C
[58] Field of Search ........................................ 331/94.5

[56] References Cited

U.S. PATENT DOCUMENTS 3,825,341  7/1974  Goto ................................... 331/94.5
3,970,963  7/1976  Chester ........................... 331/94.5 C

OTHER PUBLICATIONS

McDermott, Transmitters and Receivers for Optical Communications, Space/Aeronautics, vol. 39, (June 1963), pp. 98-106.

Primary Examiner—William L. Sikes
Attorney, Agent, or Firm—Craig & Antonelli

[57] ABSTRACT

In a tuning type laser oscillator apparatus, a common dispersion element such as diffraction grating or prism is used with a plurality of laser oscillators so that the same oscillation condition can be established for the respective oscillators by adjusting the angle of the dispersion element. This laser oscillator apparatus is applicable to laser radar and laser communication systems, with simplified structure.

15 Claims, 9 Drawing Figures

F I G. 4A
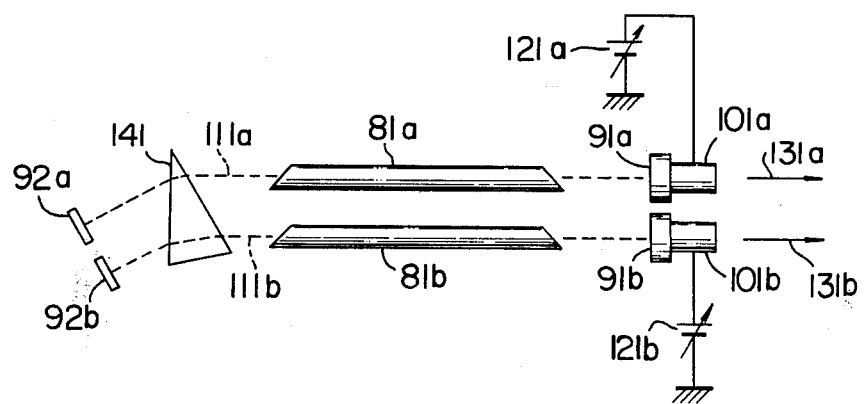

TUNING TYPE LASER OSCILLATOR APPARATUS AND LASER RADAR SYSTEM AND LASER COMMUNICATION SYSTEM USING THE SAME

BACKGROUND OF THE INVENTION

1. Field of the Invention

The present invention relates to a tuning type laser oscillator apparatus capable of varying the oscillation wavelength of a laser oscillator, and further relates to laser radar and laser communication systems incorporating such laser oscillator apparatus.

2. Description of the Prior Art

Since the oscillation frequency of a laser beam produced within a laser oscillator is essentially determined by only the wavelength corresponding to the energy difference responsible for the laser transition between an upper level and a lower level, the laser oscillator can oscillate, in principle, at discrete wavelengths only. Practically, however, the upper and lower levels participating in the laser transition have attendant energy bands, with the result that the oscillation usually develops within a spectrum interval extending to some extent. The laser oscillator is allowed to oscillate only when such a frequency in the longitudinal mode as determined by the optical length of a resonator comes into the spectrum interval and exceeds an oscillation threshold. Accordingly, it is possible to vary the oscillation frequency of the laser by varying the frequency in the longitudinal mode within the range of the spectrum interval. A conventional tuning type laser oscillator has been produced on the basis of this principle. In general, the number of oscillation spectra due to electronic transitions is one or several at most and, in addition, wavelengths of the several spectra are spaced far apart from each other in many cases. Thus, in a tuning type laser oscillator based on the electronic transistions a pair of reflecting mirrors constituting a resonator are coated wih a dielectric multi-layer film which can select an intended wavelength with a small loss, and these mirrors are associated with a slight variation with the optical length of the resonator.

On the other hand, another laser oscillator based on vibrational or rotational transitions of molecules, prevents the selection of individual branches with the dielectric multi-layer film because of the narrow spacing of the emitted branches. It has been a general measure for solving this problem that one reflecting mirror of the resonator is replaced by a diffraction grating or, alternatively, a prism is incorporated into the resonator to endow the reasonator itself with a wavelength selecting ability of high resolution and, for varying of the oscillation frequency, the frequency in the longitudinal mode was varied by slightly varying the optical length of the resonator.

In the conventional application of the laser oscillator to an optical heterodyne system two similar laser oscillators each having a diffraction grating or prism have been employed, wherein one is operated for a transmitter and the other for a local oscilator, and the difference between the two oscillators is determined to be equal to the intermediate frequency of the heterodyne system. However, such a heterodyne detector requires the two laser oscillators to be oscillated at the same branch and therefore, it is necessary to use at least two different wavelength selecting operations. Although the relation between the inclination of the diffraction grating relative to the optical axis of the resonator and the wavelength of the diffracted beam can be preselected, it is difficult to give the two wavelength selecting mechanisms the same ability and to suppress an error in the selecting operation caused by repeated usage to a practically permissible extent.

SUMMARY OF THE INVENTION

An object of the present invention is to eliminate such drawbacks as described above by providing a tuning type laser oscillator apparatus in which two or more lasers are oscillated at the same branch by means of operating a single common member and the oscillation frequency of respective lasers can.be varied within the gain curve.

Another object of the present invention is to provide a laser radar system using such a laser oscillator apparatus.

A further object of the present invention is to provide a laser communication system using such a laser oscillator apparatus.

BRIEF DESCRIPTION OF THE DRAWINGS

FIG. 4A is a plan view of a tuning type laser oscillator apparatus according to another example of the present invention;

DETAILED DESCRIPTION OF THE PRIOR ART

Figure 1:
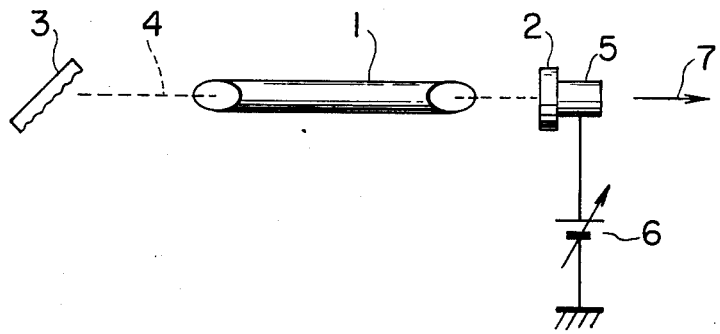
FIG. 1 is a general schematic diagram of a tuning type laser oscillator which has been available hitherto.

FIG. 1 is a general schematic diagram of a tuning type laser oscillator which has been available hitherto. As illustrated in the figure, a diffraction grating is used as a dispersion element. In the figure, reference numeral 1 designates a laser tube containing an active material, 2 an output mirror, 3 a diffraction grating, 4 the optical axis of the resonator, 5 an electrically deformable element, 6 a power source, and 7 a laser beam.

The resonator consisting of the output mirror 2 and the diffraction grating 3 selects only a wavelength which is determined dependent on an angle between the optical axis 4 of the resonator and the diffraction grating 3. Thus, the gain for a scheduled branch can be increased by setting the angle or inclination of the diffraction grating 3 such that a diffracted beam of the scheduled wavelength is oriented along the optical axis 4 of the resonator, and the radiation of that branch gives rise to standing wave resonance, which is in turn amplified by the aid of the active material contained in the laser tube 1, a portion of the amplified wave being delivered to the outside as laser beam 7. Then, by varying the voltage of the power source 6 connected to such a displaceable element as electrically deformable element 5 secured to the reflection mirror 2, it is possible to vary the length L of the resonator slightly to thereby assure the tuning of the oscillation frequency of laser within a frequency band confined in the width of the gain curve of the branch.

In the application of the tuning type laser oscillator based on the aforesaid principle to an optical heterodyne system two similar tuning type laser oscillators are employed wherein one is operated for a transmitter and the other for a local oscillation, and the difference in oscillation frequencies between the two oscillators is determined to be equal to the intermediate frequency of the heterodyne detector. To this end, the inclination of the diffraction grating for the two laser oscillators is adjusted so that the two lasers oscillate at the same branch, and then the supply voltage of the element 5 is set so that it is made equal to the intermediate frequency.

The optical heterodyne system requires two laser oscillators to be oscillated at the same branch and, therefore, it is necessary to use at least two operations to select the wavelengths. Although the relation between the inclination of the diffraction grating relative to the optical axis of the resonator and the wavelength of the diffracted beam can be preselected, it is difficult to give the two wavelength selecting mechanisms the same ability and to suppress an error in the selecting operation caused by repeated usage to a practically permissible extent.

DETAILED DESCRIPTION OF THE INVENTION

In the present invention, such drawbacks as described above can be eliminated by providing a tuning type laser oscillator apparatus in which two or more lasers are oscillated at the same branch by means of operating a single common member and the oscillation frequency of respective lasers can be varied within the gain curve.

According to the present invention, two or more laser oscillators are incorporated with a dispersion element common to the plurality of laser oscillators which functions to select a wavelength, and a length adjusting mechanism which varies the length of a laser resonator of respective laser oscillators. A diffraction grating or a prism may be used as the dispersion element.

Figure 2A:
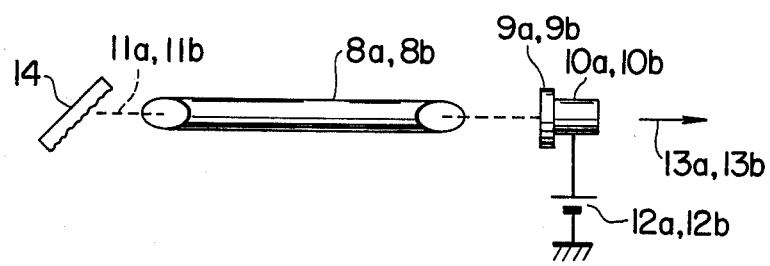
FIGS. 2A and 2B are a plan view and a side view of a tuning type laser oscillator apparatus according to the present invention, respectively.
Figure 2B:
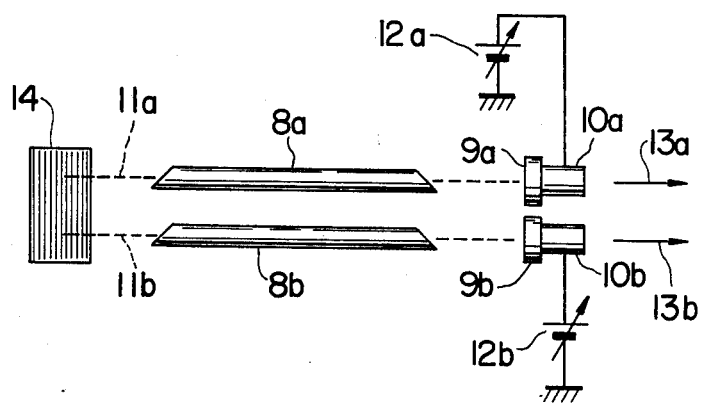

FIGS. 2A and 2B are a plan view and a side view of one embodiment of the present invention, respectively. As shown therein, a diffraction grating is used as a dispersion element. In the figures, reference numerals 8a and 8b designate designated laser tubes, 9a and 9b output mirrors, 10a and 10b electrically deformable elements, 11a and 11b the optical axes of resonators, 12a and 12b power sources, 13a and 13b laser beams, and 14 a common diffraction grating. The two laser resonators are arranged such that by orientating each of the laser tubes 8a and 8b in the direction of the grooves of the diffraction grating 14, the angle between the optical axis 11a of the resonator and the diffraction grating 14 is made equal to that between the optical axis 11b of the resonator and the diffraction grating 14. With this arrangement, the two resonators can obtain a gain at the same wavelength. The diffraction grating may be inclined such that the first order diffraction beam is orientated along the optical axis of the resonator. Generally speaking, the first order diffraction beam from an Echellete diffraction grating will occupy more than 90% of the energy of the incident beam so that the oscillation threshold can be lowered, whereby a highly efficient resonator is obtained. Further, the optical lengths of optical axes 11a and 11b of the resonators can be varied slightly by varying the voltages of the power sources 12a and 12b respectively connected to the electrically deformable elements 10a and 10b and, as a result, the resonator frequency in the longitudinal mode is caused to vary. Those frequencies in the longitudinal mode which exceed the oscillation threshold cause oscillation laser oscillator to oscillate. Therefore, slightly varying the length of the oscillator permits fine tuning of the oscillation frequency.

Figure 3:
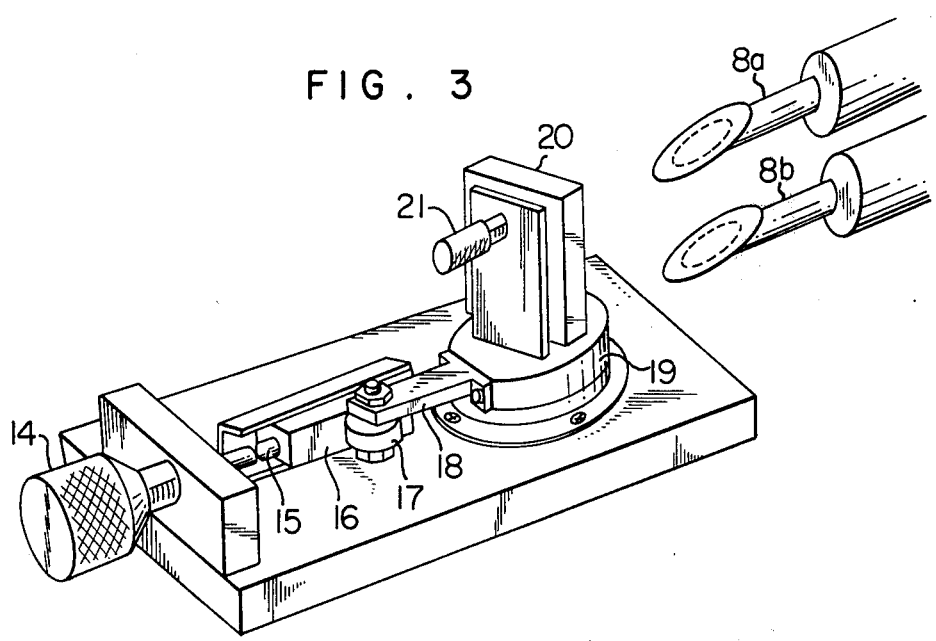
FIG. 3 is a schematic perspective view of an example of a mechanism for adjusting the position of a diffraction grating.

A mechanism for adjusting the position or inclination of the diffraction grating is shown in FIG. 3. In the figure, reference numeral 20 represents a mount for a diffraction grating. The diffracting grating is suitably fixed within the mount 20. The mount 20 may be supported at three points of a triangle to a fixed plate. Two of the three points serve as fulcra and a micrometer head 21 is attached to the portion of the other one point. A micrometer head 14 is provided for wavelength selection. The end of the micrometer head 14 pushes a pin 15 mounted to one end of a slide 16 to displace the slide 16. The slide 16 may be always biased to the micrometer head side by spring means so that the abutting between the micrometer head 14 and the pin 15 is maintained. The face of the slide 16 abutting against a ball bearing 17 has taper portions so that by the displacement of the slide 16 the bearing 17 is subjected to a force in a direction perpendicular to the direction of displacement of the slide 16. Thus, a rotation is provided to an arm 18 attached to the bearing 17 so that a rotary base 19 on which the mount 20 including therein the diffraction grating is rotated. The rotary base 19 may be always biased to the slide side by spring means so that the abutting between the slide 16 and the bearing 17 is maintained. The positional adjustment of the diffraction grating in a direction perpendicular to the direction of rotation of the rotary base 19 is carried out by means of the micrometer 21. The laser tubes 8a and 8b are disposed in front of the diffraction grating with such an interval that the optical axes of the laser tubes 8a and 8b fall within the face of the diffraction grating.

Figure 4:
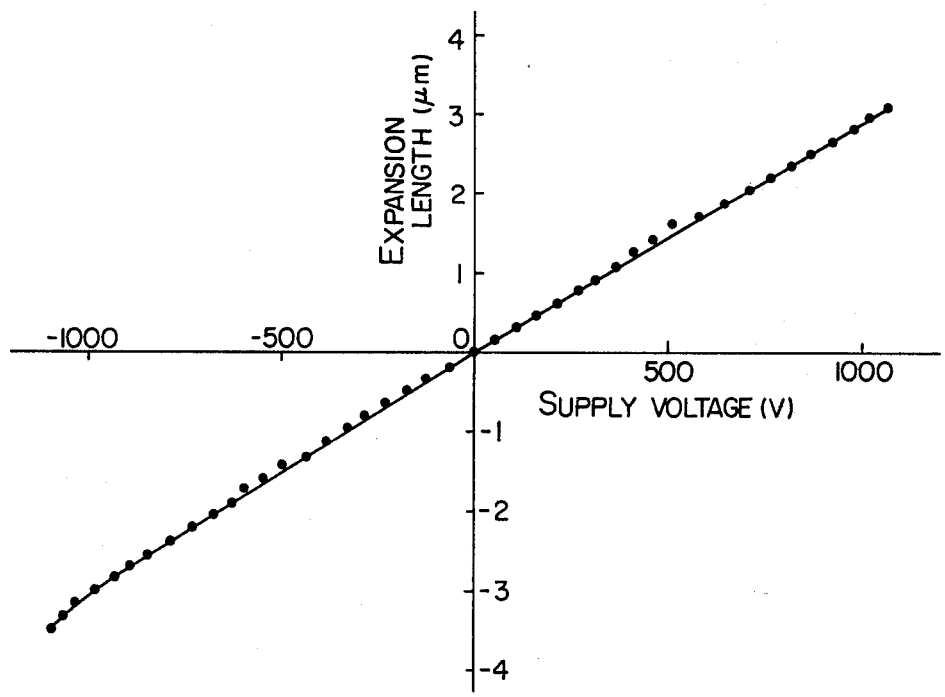
FIG. 4 is a graph showing an example of an expansion length versus supply voltage curve for an electrically deformable element.

FIG. 4 shows graph of the expansion length versus supply voltage of the electrically deformable element as shown in FIGS. 2A and 2B. The curve is plotted for a cylindrical element having an inner diameter of 24 mm, an outer diameter of 30 mm and a length of 50 mm.

Instead of the electrically deformable element used as means for varying the length of resonator slightly, another element for achieving the displacement of the length, for example a mechanical, magnetically deformable or thermally expansive element, can be expected to attain the same result. Further, a dispersion element other than the diffraction grating, for example a prism, can be used with the same result. The prism used as a dispersion element may be disposed at an internal location common to the plurality of laser resonators.

FIG. 4A shows an example of the present invention in which a prism is used as a dispersion element. In the Figure, reference numerals 81a and 81b designate laser tubes, numerals 91a and 92a are resonator mirrors for the laser tube 81a, while mirrors 91a and 92a are provided for laser tube 82b. Electrically deformable elements 101a and 101b, for displacing mirrors 91a and 91b are provided, along with power sources 121a and 121b, for the electrically deformable elements 101a and 101b. A prism 141 is disposed to intersect the optical axes 111a and 111b along which laser beams 131a and 131b travel. With this arrangement, the prism 141 is disposed so that light beams emitted from the tubes 81a and 81b along their respective optical axes 111a and 111b are refracted through the prism 141 and are directed perpendicularly to the reflection surfaces of mirrors 111a and 111b. A pair of reflection mirrors 91a, 92a and 91b, 92b are provided for each of the laser resonators and at least one of the paired reflection mirrors 91a and 91b is moved along the direction of the optical axis of each laser resonator. Similar to the case the using diffraction grating, by varying the inclination of the prism 141 relative to the optical axes 11a and 111b of the resonators by using the electrically deformable elements 101a and 101b, the simultaneous variation in the oscillation frequencies of the plurality of laser oscillators is accomplished. Specifically, with the prism used, by setting the angle between the axis of the resonator and the prism to an approximate Brewster angle, a low-loss resonator can be constructed.

Although in the foregoing embodiment, a pair of lasers are operated together with a single common diffraction grating, more than two lasers can be operated together with a single diffraction grating.

A general diffraction grating used for a $CO_2$ laser in the invention has a blaze wavelength of 8 microns, a blaze angle of 36°52′, a groove number of 150 lines per millimeters and a total dimension of 100 mm × 100 mm. When an axis-directional discharge excitation type laser tube is used, a single diffraction grating may be commonly used with two or three laser tubes. When a waveguide laser tube (for example, having an inner diameter of 1 mm and an outer diameter 10 mm) of small size is used, a single diffraction grating may be commonly used with about ten laser tubes.

As has been described above, the effect brought about by the invention resides in that by using a common wavelength selecting dispersion element with a plurality of tuning type laser oscillators, oscillation wavelengths developed in the plurality of laser oscillators can be selected at the same wavelength or branch.

Another effect of the invention resides in that by operating a single member common to a plurality of laser oscillators, a simultaneous and steady wavelength selection from respective laser oscillators can be assured.

Still a further effect of the invention resides in that only one wavelength selecting mechanism incorporated into a plurality of laser apparatus contributes to a reduction in cost. Furthermore, since the diffraction grating and the prism can be produced easily in a larger dimension than the practically available laser tube, it is easy to arrange the single dispersion element common to the plurality of lasers.

Figure 5:
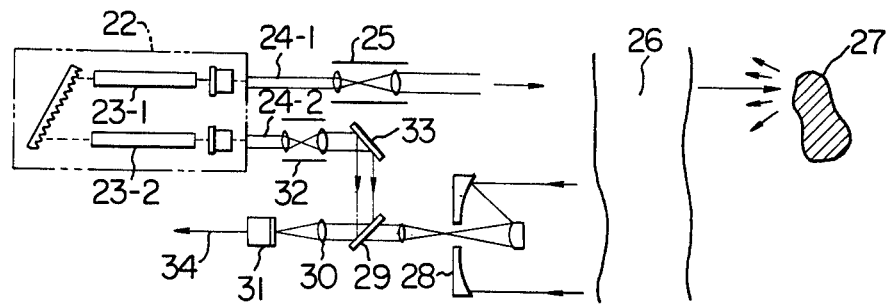
FIG. 5 is a systematic diagram of a laser radar system according to the present invention.

FIG. 5 shows an embodiment of a heterodyne type laser radar system employing the laser oscillator apparatus according to the invention. In the figure, reference numeral 22 represents a tuning type laser oscillator apparatus, 25 a collimating lens system, 26 a spacial transmission path, 27 a target or object, 28 a receiving telescope, 29 a half-transmission mirror, 30 a lens focusing 31 a light detector, 34 an output signal of the detector 31, 32 a collimating lens system, and 33 a half-tramission mirror. Two laser beams 24-1 and 24-2 produced respectively from two laser tubes 23-1 and 23-2 of the tubing type laser oscillator apparatus 22 are spectrally at the same branch and the difference in oscillation frequencies between the two laser beams is made equal to the intermediate frequency of the heterodyne detection by adjusting the voltages applied to the electrically deformable elements of the two laser tubes 23-1 and 23-2. The laser beam 24-1 for a transmitter is directed to the collimating lens system 25 and is then directed through the transmission path 26 to the object 27. The reflected light from the object 27 is converged by the telescope 28, is formed to a single flux by the half-transmission mirror 29 together with the local oscillation laser beam 24-2 collimated by the collimating lens system 32 and is irradiated upon the photoconductive surface of the detector 31. By the square low characteristic of the detector 31, the output signal 34 is extracted as the beat frequency between the reflective beam and the local oscillator beam.

Figure 6:
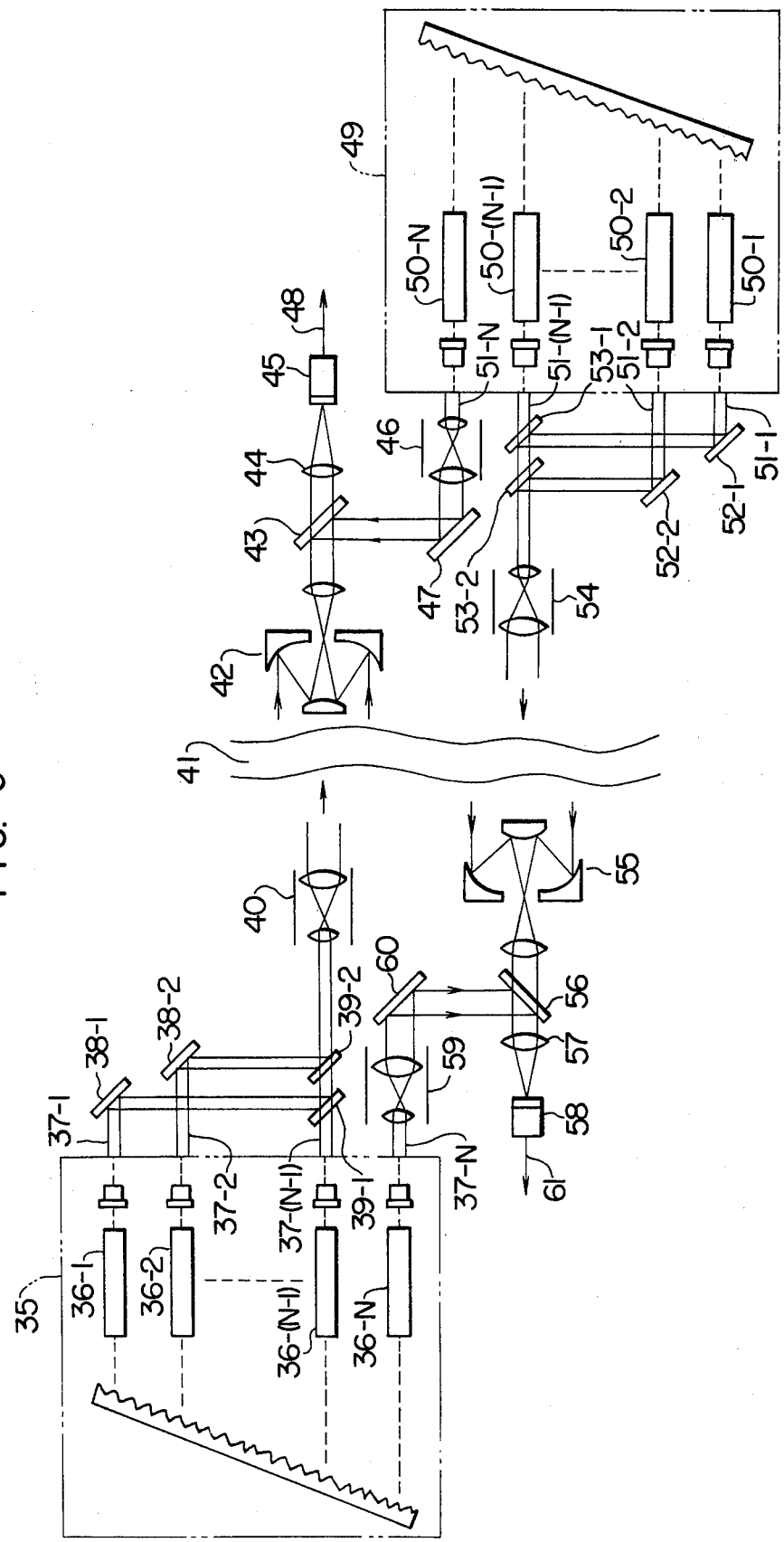
FIG. 6 is a systematic diagram of one embodiment of a laser communication system according to the present invention.

FIG. 6 shows one embodiment of a laser communication system employing the laser oscillator apparatus according to the invention. In the figure, reference numeral 35 represents a tuning type laser oscillator apparatus, 38-1, 38-2, ...... reflecting mirror, 39-1, 39-2, ..... half-transmission mirrors, 40 a collimating lens system, and 41 a transmission path. In the laser oscillator apparatus 35, (N-1) laser tubes 36-1, 36-2, ...... 36-(N-1) are used for a transmitter and one laser tube 36-N is used for a local oscillator. Elements 55, 56, 57, 58, 59 and 60 correspond to the elements 28, 29, 30, 31, 32 and 33 of FIG. 5. An identical arrangement is provided at the right hand of the FIG. 6. In the shown structure, laser beams 37-1, 37-2, ...... 37-(N-1) are transmitted as a single light flux through the reflecting mirrors 38-1, 38-2, ......, the half-transmission mirror 39-1, 39-2, ..... and the collimating lens system 40. The laser beams 37-1, 37-2, ...... may be transmitted in a time or frequency division multiplexing fashion. Such modulation techniques are conventional and are disclosed, for example, in Japanese journal "Electronic Science" Vol. 20, No. 10, pages 62 to 67, September 1970 and Proc. I.E.E.E. Vol. 56, No. 2, pages 146 to 154, 1968.

Figure 7:
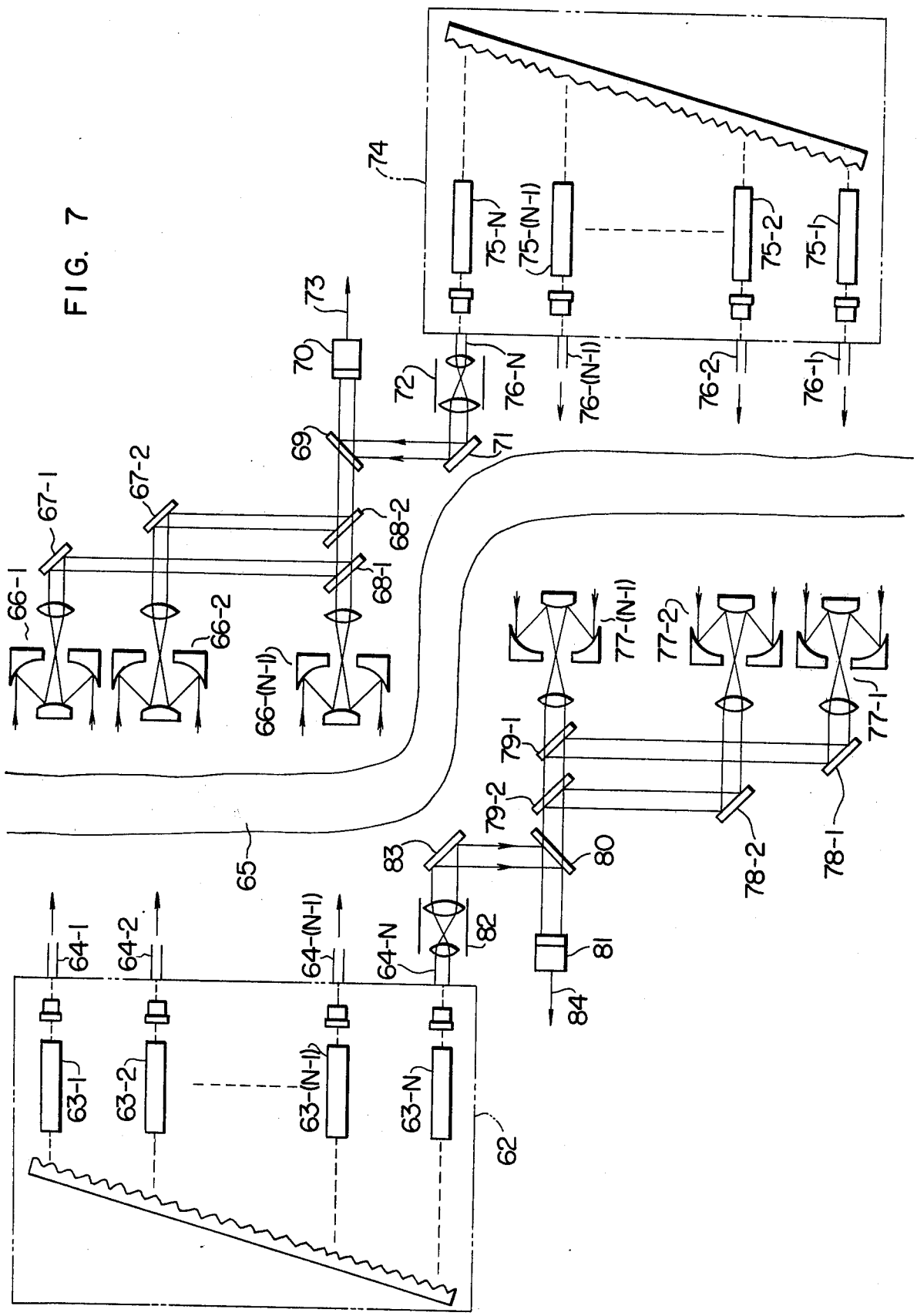
FIG. 7 is a schematic diagram of another embodiment of a laser communication system according to the present invention.

FIG. 7 shows another embodiment of a laser communication system. In this embodiment, laser beams 64-1, 64-2, ...... 64-(N-1) from laser tubes 63-1, 63-2, ...... 63-(N-1) of a tuning type laser oscillator apparatus 62 are transmitted separately in a transmission path 65, are converged separately by telescoper 66-1, 66-2, ...... 66-(N-1) and are formed into a single flux by means of half-reflecting mirrors 67-1, 67-2, ...... and 68-1, 68-2...... . Then, the light flux is detected as an output signal 73 in a similar manner to the embodiment of FIG. 6. The right and left hand portions of the system shown in FIG. 7 have the same arrangement.

Advantages of the laser communication systems shown in FIGS. 6 and 7 are the simplification of structure, a large capacity of information to be communicated and the facilitation of establishment of the oscillation condition. If N diffraction gratings ar respectively used for N laser tubes in each of transmitting and receiving stations, oscillation conditions must be established to the respective laser tubes and diffraction gratings. Then, whether or not the oscillation conditions in the transmitting station are identical may be discriminated in the receiving station and additional means for such discrimination are required. These defects are increased with the number of stations.

Although diffraction gratings are shown as dispersion elements in FIGS. 5, 6 and 7, it is a matter of course that prisms may be used instead.

I claim:

1. A tuning type laser oscillator apparatus comprising:

a plurality of laser tubes each having a respective optical axis;

a plurality of reflection mirrors respectively located at a first end of each of said laser tubes;

first means, coupled to each of said reflection mirrors, for displacing each respective mirror in the direction of the laser tube axis at said first end of which said each respective reflection mirror is located; and a wavelength selective element disposed at a second end of each of said tubes, opposite said first end, to intersect the optical axis of each of said laser tubes and reflecting a respective wavelength, within a respective range of optical wavelengths capable of being generated by said tubes, back through said tubes along the respective optical axes thereof.

2. A tuning type laser oscillator apparatus according to claim 1, wherein said wavelength selective element comprises a diffraction grating inclined to reflect the respective first order light beams generated by said laser tubes along the respective optical axes thereof.

3. A tuning type laser oscillator apparatus according to claim 2, further comprising second means, coupled to said diffraction grating, for selectively adjusting the angle of said diffraction grating relative to the optical axes of said laser tubes to simultaneously vary the wavelengths of the laser beams emitted from each of said tubes.

4. A tuning type laser oscillator apparatus according to claim 1, wherein said wavelength selective element comprises a prism and a further plurality of reflection mirrors respectively located to reflect laser light dispersed by aid prism back along the respective optical axes of said tubes.

5. A tuning type laser oscillator apparatus according to claim 4, further comprising second means, coupled to said prism, for adjusting the angle of said prism relative to the optical axes of said laser tubes to simultaneously vary the wavelengths of the laser beams emitted from each of said tubes.

6. In a laser radar system comprising:

laser transmitter means for collimating and transmitting a laser beam toward a target;

detector means for converging said laser beam reflected by said target, for combining said converged beam with a local oscillator laser beam, and for detecting the difference between the frequency of said converged beam and said local oscillator laser beam; and an apparatus for generating said transmitted laser beam and said local oscillator laser beam, the improvement wherein said apparatus comprises a tuning type laser oscillator having:

first and second laser tubes having respective first and second optical axes;

first and second reflection mirrors respectively located at a first end of each of said laser tubes;

first means, coupled to said first and second relection mirrors, for displacing said reflection mirrors in the direction of said first and second optical axes, respectively; and a wavelength selective element, disposed at a second end of each of said tubes, opposite said first end, to intersect the optical axis of each of said laser tubes and being reflective, along the respective first and second optical axes of said tubes, of a respective range of optical wavelengths capable of being generated by said laser tubes; and wherein said first laser tube generates said transmitted laser beam and said second laser tube generates said local oscillator laser beam.

7. An improved laser radar system according to claim 6, wherein said wavelength selective element comprises a diffraction grating inclined to reflect the respective first order light beams generated by said laser tubes along the respective optical axes thereof.

8. An improved laser radar system according to claim 7, further comprising second means, coupled to said diffraction grating, for selectively adjusting the angle of said diffraction grating relative to the optical axes of said laser tubes to simultaneously vary the wavelengths of the laser beams emitted from each of said tubes.

9. An improved laser radar system according to claim 6, wherein said wavelength selective element comprises a prism and a further plurality of reflection mirrors respectively located to reflect laser light dispersed by said prism back along the respective optical axes of said tubes.

10. An improved laser radar system according to claim 9, further comprising second means, coupled to said prism, for adjusting the angle of said prism relative to the optical axes of said laser tubes to simultaneously vary the wavelengths of the laser beams emitted from each of said tubes.

11. In an optical communications system having first and second transmitting and receiving stations each of which includes laser transmitter means for transmitting a laser beam towards the other station;

detector means for receiving a laser beam transmitted from the other station and for combining the received beam with a local oscillator laser beam; and an apparatus for generating said transmitted laser beam and said local oscillator laser beam, the improvement wherein said apparatus comprises a tuning type laser oscillator having:

a tuning type laser oscillator apparatus for generating said transmitted laser beam and said local oscillator laser beam, which apparatus includes first and second laser tubes having respective first and second optical axes;

first and second reflection mirrors respectively located at a first end of each of said laser tubes;

first means, coupled to said first and second reflection mirrors, for displacing said reflection mirrors in the direction of said first and second optical axes, respectively; and a wavelength selective element disposed at a second end of each of said tubes, opposite said first end, to intersect the optical axis of each of said laser tubes and being reflective, along the respective first and second optical axes of said tubes, of a respective range of optical wavelengths capable of being generated by said laser tubes; and wherein said first laser tube generates said transmitted laser beam and said second laser tube generates said local oscillator laser beam.

12. An improved optical communications system according to claim 11, wherein said wavelength selective element comprises a diffraction grating inclined to reflect the respective first order light beams generated by said laser tubes along the respective optical axes thereof.

13. An improved optical communication system according to claim 12, further comprising second means, coupled to said diffraction grating, for selectively adjusting the angle of said diffraction grating relative to the optical axes of said laser tubes to simultaneously vary the wavelengths of the laser beams emitted from each of said tubes.

14. An improved optical communications system according to claim 11, wherein said wavelength selective element comprises a prism and a further plurality of reflection mirrors respectively located to reflect laser light dispersed by said prism back along the respective optical axes of said tubes.

15. An improved optical communication system according to claim 14, further comprising second means, coupled to said prism, for adjusting the angle of said prism relative to the optical axes of said laser tubes to simultaneously vary the wavelengths of the laser beams emitted from each of said tubes.

* * * * *